July 28, 1942.  J. McELGIN  2,290,985
AIR CONDITIONING UNIT
Filed Feb. 21, 1940
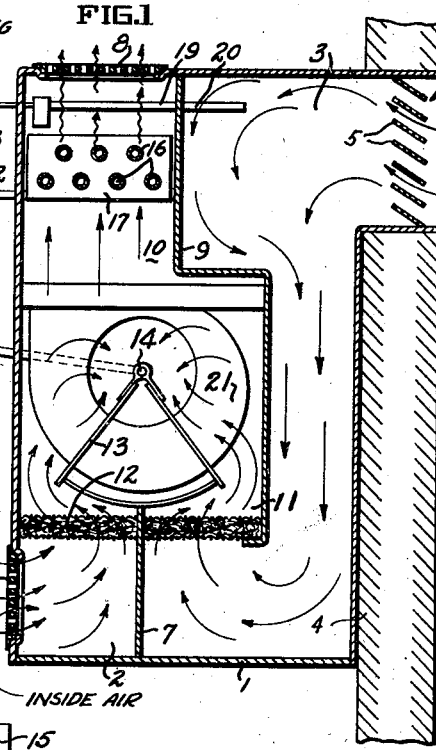
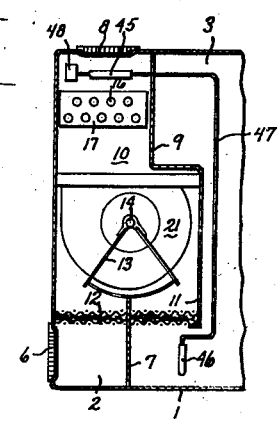
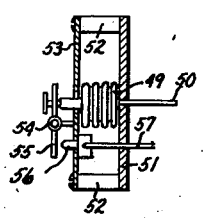
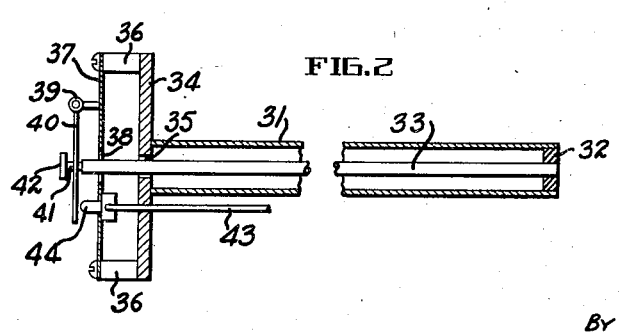
INVENTOR
JOHN McELGIN
BY
ATTORNEYS Patented July 28, 1942

2,290,985

UNITED STATES PATENT OFFICE 2,290,985

AIR CONDITIONING UNIT

John McElgin, Philadelphia, Pa., assignor to John J. Nesbitt, Inc., Philadelphia, Pa., a corporation of Pennsylvania Application February 21, 1940, Serial No. 320,144

4 Claims. (Cl. 236—38)

The present invention relates to a control means for ventilating and/or conditioning units.

In my application Serial No. 144,216 filed May 22, 1937 now Patent No. 2,216,356, dated October 1, 1940, there is disclosed a control system for unit ventilators which effectively prevents drafts. It was pointed out in said application that, in order to prevent drafts, it is desirable to place a thermostat in the air stream coming from or traversing the casing containing the heat exchanger. In mild winter weather, a proper cooling effect could be obtained by introducing outside air at approximately 10 degrees less than the inside air, without causing cold drafts. As the weather gets colder, however, and the outside temperature decreases, a lesser need arises for the introduction of outside air for the sake of this cooling power, even though the room thermostat may occasionally demand it. Furthermore, if the cooling rate is too rapid, drafts may occur and cause complaints.

In order to overcome the annoying and detrimental effects of these drafts, there was provided, in accordance with the said invention, a readjustable thermostat arranged in the air stream traversing the heat exchanger casing. This thermostat is subjected to the control of an outside thermostat which automatically readjusts the control or operating point of the thermostat in an upward direction so that it operates at a higher inside temperature as the outside temperature falls. Aside from the reduced cooling effect thereby obtained, this also gives the additional advantage of the offsetting of the drooping effect of the wide differential air stream control necessitated to prevent hunting. The readjustable air stream thermostat was controlled by varying the air pressure in the fluid pressure control circuit in accordance with the outside temperature.

While a fluid pressure control circuit of this character operates satisfactorily, the control is exercised in an indirect manner. However, in accordance with the present invention, I have made a discovery which permits the operating point of the thermostat to be controlled directly by the outside temperature. Thus, it is not necessary to effect the control through the fluid pressure cricuit and, to that extent, the changes in the outside temperature are reflected more accurately in the changes of the operating point of the thermostat.

The primary object of the present invention is to provide improved control means for ventilating and/or air conditioning units.

A more particular object is to provide a single air stream temperature control means for such units, together with improved means for automatically readjusting the control point of the thermostat upwardly, as the outside temperature is reduced.

Another object is to provide apparatus and a method for controlling and readjusting the control points of the air stream control thermostats of a plurality of air conditioning units by subjecting the thermostats directly to both the indoor and outdoor temperatures or at least to a combined indoor temperature and a temperature which changes in accordance with outdoor temperature.

A still further object is to provide a ventilating system in which the proportion of outdoor and indoor air is controlled more directly by the outdoor and indoor temperatures than in the prior art systems, thus simplifying the apparatus as well as assuring additional positiveness of control.

A final object is to provide a ventilating system employing a thermostat for operating a damper together with a simplified structure by which the thermostat regulates the indoor temperature with respect to the outside temperature in such a manner as to prevent drafts when the outside temperature decreases.

These objects are attained in brief by mounting a thermostat, not only in the air stream produced at the radiator, but also in such a position as to be directly affected by the indoor and outdoor temperatures. Thus, as the outdoor temperature decreases, the effect of this decrease in temperature controls or modifies the effects on the thermostat brought about by the indoor temperature.

Other objects and features will be apparent as the specification is perused in connection with the accompanying drawing, in which—

Figure 1 shows an improved automatic ventilating system in which the thermostat is subjected directly to the composite effect of indoor and outdoor air, also to the outdoor air, per se.

Figure 2 is a longitudinal view, partly in section, of a typical thermostat which may be employed in the system shown in Figure 1.

Figure 3 is a fragmentary view of the improved automatic ventilating system but in which the thermostat is of a different type from that shown in Figure 1.

Figure 4 is a longitudinal view partly in section, showing the actuating portion of the thermostat which is illustrated in Figure 3.

Referring to the drawing in detail, particularly to Figure 1, the casing 1 of the air conditioning unit may take the general form of a rectangular metal box having a recirculated air inlet 2 near the bottom of the box and an outdoor air inlet 3 at the top of the box. As shown, the casing may be fitted into an opening in the wall 4 of a building at a window casement. The opening 3 is preferably provided with inclined louvers 5 and the opening 2 is shown as being provided with a grill 6. The openings 2 and 3 are separated by a wall or partition 7. The box is provided at the end opposite from the grill 6 with grill openings, indicated at 8, for the egress of the mixed air. Within the casing 1 there is a partition 9 which together with the openings 8 form a closed compartment 10. The partition at the other end forms a compartment 11 which is open at the lower end and contains a filter 12 of any suitable and well-known design. This compartment contains a damper 13 pivoted at 14 and is adapted to swing right and left in response to the actuation of a damper motor 15 through a linkage 15'. The damper in moving to the left tends to close the opening between the partition 7 and the left side of the casing 1 and in moving to the right closes the opening between the partitions 7 and 9. Within the compartment 10 there is a radiator indicated by the steam pipes 16 on which are mounted a number of transversely extending fins 17. The radiator is caused to be heated by steam flowing through a pipe 18, as indicated in Figure 1. In order to control the amount of steam fed to the radiator 16 and to control the operation of the damper 13 there is provided a thermostat 19 which is positioned between the radiator and the openings 8.

As will be noted, a portion 20 of the thermostat 19 projects through the partition 9 and is exposed directly to the cool air admitted through the opening 3.

In addition to the radiator 17 and the thermostat 19 the compartment 10 contains a blower system consisting of a plurality of centrifugal units 21 preferably positioned on the same axis as the pivot 14 and actuated by a common electrical motor (not shown). Thus, the mixture of inside and outside air, as determined by the position of the damper 13, is admitted to the eye of each blower and expelled or discharged through a suitably positioned peripheral passageway. As is well-known, blowers of this type, include a volute chamber which changes the axial direction of the air entering the eye of the blower into a tangential direction as the air leaves the discharge opening. The arrangement is such that the air from the blowers passes between the walls of the radiator including spaces between the fins and leaves the radiator in a heated condition. The radiator is provided with steam through a pipe 18 which contains an adjusting valve 22. The adjustment of the valve 22 is controlled by a so-called "modulating" valve 23 which is connected to the fluid system by means of a pipe 24 and is, therefore, responsive to the pressure of the fluid system.

The damper motor or engine 15 obtains its energy from the variations in pressure of a fluid, preferably air, which passes through the pipe 25. The pipe 25 connects through a branch line 26, a restrictive valve 27, a room thermostat 28, with a tank 29. The latter is filled with air under pressure from a crank operated compressor 30. The pipe line just traced constitutes part of a fluid pressure system for controlling the heating and ventilating effects within the air conditioning unit.

As the fluid pressure in the pipe 25 varies for reasons which will be explained hereinafter, the motor 15 swings the damper 13 about its pivot to change the relative proportion between the inside or recirculated air and the outside air being admitted to the casing.

While a number of forms of the thermostat 19 may be employed for the purpose of this invention, I prefer the type shown in detail in Figure 2. As illustrated, the thermostat depends for its operation on the difference in heat expansion of two different metals and this difference of expansion is translated into a change of pressure in the fluid system by permitting different amounts of fluid to escape from the system, depending on the intensity of heat to which the thermostat is exposed. One of these metals may comprise a sleeve 31 of brass which is rigidly secured at one end by a disk 32 to a centrally disposed rod 33 of invar or any other suitable metal composition which has a different rate of heat expansion than brass. The brass cylinder 31 is rigidly secured at the end opposite from the disk 32 to a metal disk 34 which contains an opening 35 sufficiently large loosely to receive the rod 33. The disk 34 carries a plurality of spacers 36 to which are secured a metal plate 37. The latter also has a fairly large central opening 38, through which the rod 33 projects. A pivot member 39 is secured to the plate 37, this member carrying a bar 40. There is an opening (not shown) in the bar 40, which receives the shank portion 41 of a thumb screw 42 which is threaded into the end of the rod 33.

A pipe 43 projects transversely through the disk 34 and terminates in a leakstat or nozzle 44. The latter has an opening (not shown), through which fluid which is contained in the pipe 43 can be emitted. The pipe is connected to the fluid system at the branch line 26, as indicated in Figure 1.

It is apparent that, as the sleeve 31 is cooled by a lowering of the temperature of the air passing through the radiator 16 (Figure 1), a given point on the sleeve 31 will move to the right with respect to a point directly below the given point on the rod 33. This is due to the contraction of the sleeve without a corresponding contraction on the part of the rod 33. As the sleeve moves to the right, it carries with it in the same direction the disk 34 and the plate 37 which, in turn, moves the pivot point 39 also to the right. The movement of the latter will cause the arm 40 to fulcrum about the lefthand end of the rod 33, causing the lower end of the bar 40 to move away from the nozzle 44. The greater the contraction of the sleeve 31, the further away will be the lower end of the bar 40 from the lefthand end of the nozzle 44. It is apparent that an increased heating of the sleeve 31 will have the reverse effect and will cause the lower end of the bar 40 to move closer to the nozzle 44.

Assuming that the opening in the nozzle 44 has been uncovered by the removal of the bar 40 upon a contraction of the sleeve 31, air or other fluid is permitted to escape from the pipe 43 which has the effect of reducing the air pressure not only in that pipe, but also throughout the entire fluid system including the pipes 25, 26 and 24. A reduction in the pressure of this system may be sufficient to cause the modulating valve 23 to open the steam valve 22 to supply the radiator 16 with steam.

In addition, the reduced aforementioned pressure will cause the damper motor 15 to swing the damper 13 to the right (Figure 1) and reduce the amount of outside air being admitted, depending on the amount demanded by the thermostat and in like proportion increasing the amount of air which is obtained from the heated room and recirculated through the unit. Thus, the thermostat 19, by controlling the amount of air which is permitted to escape at the leakstat 44, varies the pressure in the fluid system which, in turn, makes the necessary adjustments in the amount of heat supplied to the radiator and/or the proportions of the inside and outside air admitted to the casing to maintain a relatively constant temperature at the position of the thermostat.

The room thermostat 28 also serves to control the pressure in the fluid system in accordance with the temperature in the room remote from the radiator. A pneumatic thermostat of this character is well known in the art and needs no further explanation.

In order to prevent the possibility of hunting due to frequent changes in the inside or outside temperature, it is customary to provide the thermostat with a wide differential of expansion. In other words, the controlling effects are not exercised unless the changes in temperature become quite material. However, by providing a wide expansion differential air stream control, an undesirable drooping effect might be introduced in the temerature characteristics and this gives rise, at least in part, to drafts and other inconveniences from the comfort standpoint.

In accordance with my prior invention, there is provided an automatic arrangement by which the control point of the thermostat is changed in response to a change of outdoor temperature so that neither a wide differential of adjustment is necessary at the thermostat, nor is any hunting effect introduced. This automatic adjustment is brought about by means of a bellows contained within the thermostat and serving to move the air nozzle or leakstat with respect to the pivoted arm in accordance with changes of outdoor temperature. An arrangement of this character operates satisfactorily, but in accordance with the present invention, I have found that the adjustment bellows is not necessary and that the control point of the thermostat can be changed by directly exposing a portion of the thermostat to the outdoor air or at least to an unheated mixture of outdoor and indoor air. To this extent, the present improvement offers a somewhat more simplified structure than that shown in my prior application.

It can readily be seen that to offset the effect of the colder air striking a portion of the thermostat, the remaining portion must be heated to a greater degree. The rate at which the control point is thus changed is obviously dependent not only on the temperature of the outside air but also on the degree of mixture of this outside air with the inside air. The relative lengths of the thermostat which is exposed to these various types of air also assist in the determination of the control point. These factors are adjusted to provide an increase in the control point of the thermostat as the temperature of the outside air decreases. The range over which the thermostat is adjusted will usually fall between 60 degrees and 75 degrees. Thus, in mild weather, a 60 degree low limit may prevail, while in weather of 20 degrees or below, a 75 degree low limit might be used. Consequently, in very cold weather, for example, 20 degrees or below, the compensatory effect on the thermostat produced by the outdoor air would cause the thermostat to operate the steam valve and the damper at the 75 degree low limit instead of the 60 degree limit. This advanced adjustment of the thermostat prevents the discharge temperature from becoming less than 75 degrees during cold weather and, therefore, precludes drafts.

The heated air from the radiator 16 causes the sleeve of the thermostat 19 to expand and compensatory effects are introduced at the thermostat by the cooling effect of the air introduced through the opening 5 and striking the projecting portion of the thermostat. This cool air passes downwardly as shown between the casing 9 and the wall 4 and, together with the recirculated air passing through the inlet 6, is drawn into the eye of the fan 21. The mixed air thereupon passes upwardly through the radiator where it is heated and thence out through the discharge openings 8. The cooling effects introduced at the projecting portion 20 of the thermostat serve to increase the operating point of the latter. Thus, the control point of the thermostat becomes self-compensating for changes in outside temperature.

In Figure 3, a form of thermostat is employed which is different from the previous figures. In this figure, I have shown a volatile liquid thermostat formed in two sections, 45 and 46, connected together by tubing 47 and also connected to the actuating portion 48 of the thermostat. The latter portion is shown in Figure 4. It will be noted that the thermostat section 53 is positioned directly over radiator 16 and therefore subjected to heated mixed air whereas the thermostat section 46 is positioned to the right of the wall 7 and therefore subjected to the outside air. The tubes 45, 46 are filled with a low boiling point liquid or other fluid which expands rapidly upon being heated. It is apparent that since the temperatures of the heated air passing through the radiator and of the outside air admitted through the louvers 5 affect the volatile liquid in the tubes in a different manner, the combined pressure of the fluid in the thermostat sections 45, 46 will represent the differential effects of the two air temperatures. These pressure variations are transmitted to a bellows 49 through a pipe 50. The bellows is carried on a disk 51 from which is supported by the spaces 52 a disk 53. The pivot member 54 is secured to the disk 53 and a lever or bar 55 is adapted to rotate about the pivot thereof. There is also a leakstat or nozzle 56 secured to the disk 53, the end of which is presented to the bar 55. The leakstat forms a terminus 57 of a fluid pressure control system as was described in connection with Figure 1.

Consequently, as the pressure of the fluid within the bellows 49 increases upon increase of temperature, the bar 55 is moved about the pivot 51 and toward the leakstat 56. Thus, any leakage of the fluid in the pressure control system is reduced, as was explained in connection with an expansion of the sleeve 31 under the same conditions in Figure 2. On the other hand, as the temperature is reduced, the bellows 49 contracts, swinging the bar 55 away from the leakstat, uncovering the opening therein and permitting fluid to leak at this point. Thus, the pressure within the fluid control system is reduced. As is explained in connection with Figure 1, this change in pressure in the fluid control circuit serves to actuate the modulating valve 23 and, therefore, the steam valve 22 which causes the actuation of the damper motor 15 and the damper 13. It is, therefore, apparent that the differential expansion effects caused by the thermostat sections 45, 46 serve to change the control point of the leakstat which in turn controls the actuation of the steam valve 22 and the position of the damper 13 in accordance with the combined temperatures of the mixed air passing through the radiator and of the outside air. It will be further apparent that the regulation of the system may be such that the temperature of the mixed air passing through the radiator 16 can be progressively increased as the fresh air temperature becomes lower.

This application is a continuation in part of my prior application, Serial No. 270,984, filed May 1, 1939, and entitled "Air conditioning apparatus."

It will be understood that I desire to comprehend within my invention such modifications as come within the scope of the claims and the invention.

Having thus fully described my invention, what I claim as new and desire to secure by Letters Patent is:

1. An air conditioning unit comprising a radiator heated by fluid, a damper which admits predetermined quantities of recirculated air and fresh air to said unit, a common means for controlling said damper, also the passage of fluid to said radiator, said means including a single-unit thermostat having a plurality of metal members of different heat expansion coefficients, said members being exposed to the heat from said radiator and to said fresh air.

2. An air conditioning unit comprising a source of heat and a damper which controls the relative quantities of outdoor and recirculated air admitted to said unit, and a single-unit thermostatic means for controlling said heat source and damper, said means including a pair of metal members having different coefficients of heat expansion and contraction, said members being exposed to said heat source and to the outdoor air.

3. An air conditioning unit comprising a source of heat and a damper which admits predetermined quantities of recirculated air and fresh air to said unit, means comprising a single unit thermostat having a plurality of members of different heat expansion coefficients, said members being directly exposed to the source of heat and to said fresh air for controlling said source of heat and said damper.

4. An air conditioning unit comprising a source of heat and a damper which controls the relative quantities of outdoor and re-circulated air admitted to said unit, and a common means including a fluid pressure system for controlling said heat source and damper, said means including a single unit thermostat with a pair of members having different coefficients of heat expansion and contraction, said members being directly exposed in part to said heat source and in part to the out-door air to vary the pressure of said fluid system whereby the relative quantities of out-door and re-circulated air are controlled.

JOHN McELGIN.